US009806814B2

(12) United States Patent
Krishnan et al.

(10) Patent No.: US 9,806,814 B2
(45) Date of Patent: Oct. 31, 2017

(54) JOINT ACQUISITION OF CHROMATIC DISPERSION AND FREQUENCY OFFSET IN OPTICAL SYSTEMS (71) Applicant: Futurewei Technologies, Inc., Plano, TX (US)

(72) Inventors: Murali Krishnan, San Diego, CA (US); Qing Guo, Dublin, CA (US); Fei Zhu, San Jose, CA (US); Yu Sheng Bai, Los Altos Hills, CA (US)

(73) Assignee: Futurewei Tecnologies, Inc., Plano, TX (US)

( * ) Notice: Subject to any disclaimer, the term of this patent is extended or adjusted under 35 U.S.C. 154(b) by 0 days.

(21) Appl. No.: 14/951,195

(22) Filed: Nov. 24, 2015

(65) Prior Publication Data
US 2017/0149502 A1 May 25, 2017

(51) Int. Cl.
*H04B 10/08* (2006.01)
*H04B 10/2513* (2013.01)
(Continued)

(52) U.S. Cl.
CPC ......... *H04B 10/2513* (2013.01); *H04B 10/40* (2013.01); *H04B 10/532* (2013.01)

(58) Field of Classification Search
CPC .............. H04B 10/613; H04B 10/6161; H04B 10/2513; H04B 10/40; H04B 10/532;
(Continued)

(56) References Cited

U.S. PATENT DOCUMENTS 7,050,419 B2 * 5/2006 Azenkot ................. H04L 5/026
370/347
8,909,068 B2 * 12/2014 Stojanovic ........... H04B 10/613
398/208
(Continued)

FOREIGN PATENT DOCUMENTS

CN 102725960 A 10/2012
DE WO 2014114332 A1 * 7/2014 ......... H04L 27/0008
(Continued)

OTHER PUBLICATIONS

Tran, A., et al., "840-Gb/s Optical Coherent Pol-Mux Single Carrier System With Frequency Domain Equalization and Training Sequences," IEEE Photonics Technology Letters, vol. 24, No. 11, Jun. 1, 2012, pp. 885-887.
(Continued)

Primary Examiner — Hibret Woldekidan
(74) Attorney, Agent, or Firm — Conley Rose, P.C.

(57) ABSTRACT

An optical transceiver in an optical communications network, comprising a receiver configured to receive an optical signal comprising an X-polarization component and a Y-polarization component. The optical transceiver further comprises a processor coupled to the receiver and configured to determine a chromatic dispersion (CD) estimate and a local oscillator frequency offset (LOFO) estimate based on a relationship between a plurality of CD values and a plurality of LOFO values. The optical transceiver further comprises a transmitter coupled to the processor and configured to transmit the CD estimate, the LOFO estimate, and the optical signal to a downstream component in the optical communications network.

18 Claims, 6 Drawing Sheets (51) Int. Cl.
*H04B 10/532* (2013.01)
*H04B 10/40* (2013.01)

(58) Field of Classification Search
CPC .......... H04B 10/614; H04B 10/6162;
H04B 10/612; H04B 7/02; H04B 7/0452;
H04B 10/548; H04B 10/2575;
H04B 10/616; H04B 10/61;
H04B 10/6165; H04B 10/63;
H04B 10/6164; H04B 10/611;
H04B 10/07951; H04L 27/2655;
H04L 27/2692; H04L 5/0007;
H04L 5/0023; H04L 25/40;
H04L 25/0222; H04W 24/02;
H04J 14/007; H04J 14/08
USPC ..... 398/29, 22, 147, 148, 159, 81, 135–139,
398/25, 202, 205
See application file for complete search history.

(56) References Cited

U.S. PATENT DOCUMENTS

| | | | | |
|---|---|---|---|---|
| 8,948,612 | B2* | 2/2015 | Cai | H04B 10/616 398/203 |
| 9,258,065 | B2* | 2/2016 | Salsi | H04B 10/61 |
| 9,647,767 | B2* | 5/2017 | Guo | H04B 10/6164 |
| 2005/0013381 | A1* | 1/2005 | Suh | H04B 7/068 375/260 |
| 2010/0232805 | A1* | 9/2010 | Cai | H04B 10/61 398/158 |
| 2011/0293040 | A1* | 12/2011 | Dupont | H03H 21/0018 375/316 |
| 2012/0230678 | A1* | 9/2012 | In De Betou | H04L 7/041 398/27 |
| 2013/0243422 | A1* | 9/2013 | Hauske | H04B 10/07 398/25 |
| 2013/0279492 | A1* | 10/2013 | Mehta | H04L 27/2656 370/350 |
| 2014/0147111 | A1* | 5/2014 | Kan | H04B 10/613 398/25 |
| 2015/0085851 | A1* | 3/2015 | McCoy | H04W 24/10 370/342 |
| 2015/0280853 | A1 | 10/2015 | Sun et al. | |
| 2015/0311978 | A1* | 10/2015 | Chen | H04B 10/2513 398/147 |
| 2016/0226596 | A1* | 8/2016 | Stojanovic | H04B 10/6161 |
| 2016/0286011 | A1* | 9/2016 | Kasher | H04L 69/22 |
| 2016/0330059 | A1* | 11/2016 | Eitan | H03M 13/1505 |
| 2017/0111147 | A1* | 4/2017 | Cao | H04L 5/005 |

FOREIGN PATENT DOCUMENTS

| | | |
|---|---|---|
| WO | 2014114332 A1 | 7/2014 |
| WO | 2014180495 A1 | 11/2014 |

OTHER PUBLICATIONS

Foreign Communication From a Counterpart Application, PCT Application No. PCT/CN2016/106281, International Search Report dated Feb. 8, 2017, 5 pages.

* cited by examiner

JOINT ACQUISITION OF CHROMATIC DISPERSION AND FREQUENCY OFFSET IN OPTICAL SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communications systems facilitate high-speed and high-bandwidth data transmission over short and long distances (e.g., from a few hundred meters within a datacenter to thousands of meters of underwater fiber). One type of optical communication system for transmitting data over long distances is known as a long-haul optical communication system. In long-haul optical communication systems, data rates are increased by employing coherent optical transmissions, in which data may be modulated onto amplitudes, phases, and/or polarization components of an optical carrier signal. In these long-haul optical communication systems, the performance may be limited by fiber optic impairments such as chromatic dispersion (CD), local oscillator frequency offset (LOFO), polarization mode dispersion (PMD), phase noise, and non-linear effects.

For example, CD may cause different spectral components (e.g., wavelengths) in a light signal to travel through an optical fiber at different speeds and arrive at a receiver at different time instants, and thus may broaden the light pulses that carry the data and lead to ISI. As another example, LOFO is a frequency offset between a received data carrier and a local oscillator in a receiver. For lasers used in coherent optical communication systems, a LOFO can reach up to about +/−3 gigahertz (GHz) and can create a linear ramp in the phase of mixed signals. The combination of CD and LOFO, if left uncompensated for, can significantly hinder and even prevent proper downstream processing of the data transmitted through the optical communication systems. In coherent optical communications systems that use a multiple-subcarrier-based transmission (e.g., orthogonal frequency-division multiplexing (OFDM)), accurate compensation for CD and LOFO can take on an increased importance when compared to single-carrier-based transmission. For example, when using multiple-subcarrier-based transmission, an amount of time available for determining compensation for the CD and LOFO may be limited. Accordingly, a method for quickly and accurately determining compensation for CD and LOFO in coherent optical communications systems may be desirable.

SUMMARY

In one embodiment, the disclosure includes an optical transceiver in an optical communications network, comprising a receiver configured to receive an optical signal comprising an X-polarization component and a Y-polarization component, a processor coupled to the receiver and configured to determine a CD estimate and a LOFO estimate based on a relationship between a plurality of CD values and a plurality of LOFO values, and a transmitter coupled to the processor and configured to transmit the CD estimate, the LOFO estimate, and the optical signal to a downstream component in the optical communications network.

In some embodiments, the disclosure also includes an optical transceiver, wherein the relationship is a two-dimensional measurement grid associated with the optical signal, wherein the two-dimensional measurement grid comprises a plurality of intersecting grid points, and wherein a first axis of the two-dimensional measurement grid comprises the CD values and a second axis of the two-dimensional measurement grid comprises the LOFO values.

In some embodiments, the disclosure also includes, alone or in combination with the above, an optical transceiver, wherein the processor is further configured to select an intersecting grid point in the two-dimensional measurement grid, wherein the intersecting grid point is associated with a first CD value and a second LOFO value, process the optical signal at the intersecting grid point in a time domain, process the optical signal at the intersecting grid point in a frequency domain, and determine a first metric for the optical signal at the intersecting grid point according to the optical signal after the processing in the time domain and the frequency domain.

In some embodiments, the disclosure also includes, alone or in combination with the above, an optical transceiver, wherein the optical signal comprises a reference training preamble that comprises a plurality of sequentially transmitted repeating symbol sequences.

In some embodiments, the disclosure also includes, alone or in combination with the above, an optical transceiver, wherein the processor is further configured to apply a conjugate of the first LOFO to the X-polarization component and the Y-polarization component to form a processed optical signal comprising a processed X-polarization component and a processed Y-polarization component, and determine a frequency domain representation for the processed optical signal in the time domain.

In some embodiments, the disclosure also includes, alone or in combination with the above, an optical transceiver, wherein the processor is further configured to apply a conjugate of a phase value of the first CD value to the processed X-polarization component and the processed Y-polarization component, and determine a time domain representation for the processed optical signal in the frequency domain.

In some embodiments, the disclosure also includes, alone or in combination with the above, an optical transceiver, wherein the processor is further configured to correlate the processed X-polarization component to a first conjugate of the X-polarization component of a locally generated preamble, correlate the processed X-polarization component to a second conjugate of the Y-polarization component of the locally generated preamble, correlate the processed Y-polarization component to the first conjugate of the X-polarization component of the locally generated preamble, and correlate the processed Y-polarization component to the second conjugate of the Y-polarization component of the locally generated preamble.

In some embodiments, the disclosure also includes, alone or in combination with the above, an optical transceiver, wherein the processor is further configured to determine a first average of metrics of the processed X-polarization component over a time period, determine a second average of metrics of the processed Y-polarization component over the time period, determine a first maximum of the first average, determine a second maximum of the second average, and determine a final metric, wherein the final metric comprises a greater value of the first maximum and the second maximum.

In some embodiments, the disclosure also includes, alone or in combination with the above, an optical transceiver, wherein the processor is further configured to determine additional final metrics for each of a plurality of additional intersecting grid points in the two-dimensional measurement grid.

In some embodiments, the disclosure also includes, alone or in combination with the above, an optical transceiver, wherein the processor is further configured to determine the CD and LOFO estimate according to a third maximum value of the final metrics.

In some embodiments, the disclosure also includes, alone or in combination with the above, an optical transceiver, wherein the processor is further configured to apply the CD estimate and the LOFO estimate to the optical signal prior to transmitting the optical signal to the downstream component.

In another embodiment, the disclosure includes a method implemented in an optical transceiver, comprising receiving, by a receiver module, a data payload, determining, by a processor, a training preamble comprising a plurality of repeating data sequences, wherein each data sequence comprises a basic data sequence with low cross-correlation and orthogonality, and transmitting, by a transmitter module, the training preamble and the data payload to an optical receiver to provide for acquisition of a timing synchronization between the optical receiver and the training preamble.

In some embodiments, the disclosure also includes a method, wherein the data sequences are 32 symbol Golay sequences.

In yet another embodiment, the disclosure includes a method for compensating for impairments in an optical signal and implemented in an optical transceiver in a communications network, comprising receiving, from an optical transmitter, an optical signal, determining, according to the optical signal, a CD estimate and a LOFO estimate for joint compensation according to a relationship between a plurality of CD values and a plurality of LOFO values, and transmitting the CD estimate, the LOFO estimate, and the optical signal to a downstream node in the communications network for processing by the downstream node, wherein the CD estimate and LOFO estimate facilitates processing of the optical signal by the downstream node.

In some embodiments, the disclosure also includes a method, wherein the relationship is a measurement grid, wherein the measurement grid comprises a plurality of intersecting grid points, wherein a first axis of the measurement grid comprises a first CD value and a second axis of the measurement grid comprises a first LOFO value, and wherein the determining comprises calculating the first CD value dynamically according to a minimum expected CD and a maximum expected CD and calculating the first LOFO value dynamically according to a minimum expected LOFO and a maximum expected LOFO.

In some embodiments, the disclosure also includes, alone or in combination with the above, a method, wherein the determining further comprises calculating a metric for an intersecting grid point in the measurement grid by selecting a first intersecting grid point in the measurement grid, wherein the intersecting grid point comprises the first CD value and the first LOFO value, processing the optical signal a first time in a time domain according to a conjugate of the first LOFO value, processing the optical signal in a frequency domain according to a conjugate of a phase response due to the first CD value, processing the optical signal a second time in the time domain to determine a correlation of the optical signal with a conjugate of a preamble of the optical signal, calculating a polarization metric for the optical signal, calculating an average of the optical signal in the time domain according to the correlation of the optical signal with the conjugate of the preamble of the optical signal; and calculating a first final metric for the first intersecting grid point.

In some embodiments, the disclosure also includes, alone or in combination with the above, a method, wherein the determining further comprises calculating a second final metric for a second intersecting grid point in the measurement grid.

In some embodiments, the disclosure also includes, alone or in combination with the above, a method, wherein the determining further comprises calculating the CD estimate and the LOFO estimate according to a maximum of the first final metric and the second final metric.

In some embodiments, the disclosure also includes, alone or in combination with the above, a method, wherein the optical signal comprises a reference training preamble that comprises a plurality of sequentially transmitted repeating data sequences.

In some embodiments, the disclosure also includes, alone or in combination with the above, a method, wherein the preamble comprises a plurality of Golay sequences.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a process for determining a CD estimate for compensation in an optical signal and a LOFO estimate for compensation in the optical signal jointly according to a two-dimensional measurement grid. The two-dimensional measurement grid facilitates programmability of an accuracy of the joint CD and LOFO estimation process through independently configuring a resolution of the x-axis and a resolution of the y-axis of the measurement grid. To determine the joint CD and LOFO estimate, the optical signal is received and processed in both time and frequency domains. To provide for an increased speed of determining the joint CD and LOFO estimate, the present disclosure provides for configurability to comply with available hardware in a network device performing the joint CD and LOFO estimation process such that the process may be configured to have more or less accuracy, operate in parallel to reduce determination time, etc. The joint CD and LOFO estimation determined according to the present disclosure may in some embodiments be applied to the optical signal prior to transmitting the optical signal to a downstream network device, or in other embodiments may be transmitted alongside the optical signal to the downstream network device for the downstream network device to apply compensation according to the joint CD and LOFO estimation.

Figure 1:
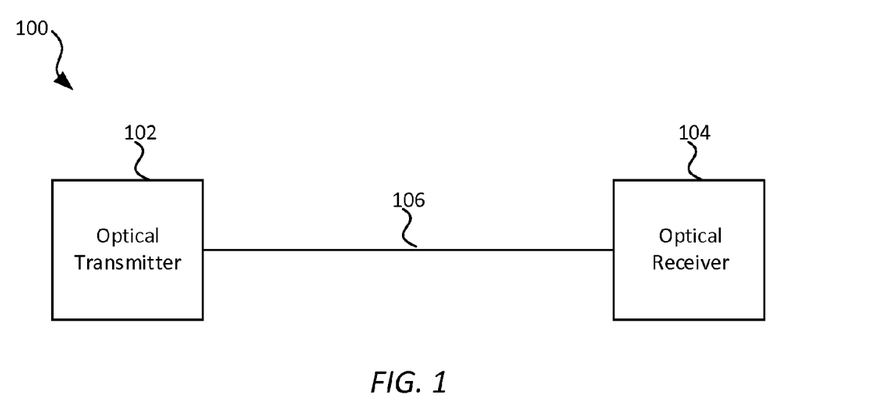
FIG. 1 is a schematic diagram of an embodiment of an optical communications network.

FIG. 1 is a schematic diagram of an embodiment of an optical communications network 100 (e.g., a coherent optical communications network) in which an embodiment of the present disclosure may operate. In one embodiment, the network 100 comprises a transmitter 102 communicatively coupled to a receiver 104 through an optical connection 106. In alternative embodiments, the network 100 may comprise a plurality of transmitters 102, a plurality of receivers 104, or both. The transmitter 102 is configured to transmit optical signals to the receiver 104 via the optical connection 106. Both the transmitter 102 and the receiver 104 may be implemented in transceivers such that each transceiver facilitates bi-directional data communications.

The transmitter 102 comprises electrical-to-optical components (e.g., one or more laser diodes, one or more electrical drivers, one or more electrical-to-optical converters, or other suitable components for converting electrical data into optical data) for modulating electrical data signals onto an optical carrier (e.g., an optical carrier generated by a laser diode). For example, the transmitter 102 may modulate electrical data signals onto an optical carrier to form an optical signal that comprises two orthogonal linear-polarization components, an X-polarization component and a Y-polarization component.

The optical connection 106 comprises fiber optic cabling for carrying an optical signal from the transmitter 102 to the receiver 104. The optical connection 106 may also comprise various components such as optical filters, optical amplifiers, or other devices located between the optical transmitter 102 and the optical receiver 104. The optical connection 106 may comprise one or more impairments such as, for example, CD, SOP rotations, polarization mode dispersion, polarization dependent loss, polarization dependent gain, non-linear phase noise, and optical white Gaussian noise. Additionally, imperfections in the transmitter 102 and/or the receiver 104 and/or a mismatch between the transmitter 102 and the receiver 104 may contribute to imperfections in the optical signal received at the receiver 104, such as LOFO and in-phase and quadrature phase (IQ) imbalance.

The receiver 104 comprises optical-to-electrical components (e.g., a photodiode, one or more analog-to-digital convertors, a digital signal processing unit, or other suitable components for converting optical data into electrical data) for converting a received optical signal into electrical data signals. For example, the receiver 104 may be configured to receive an optical signal comprising an X-polarization component and a Y-polarization component and split the X-polarization component from the Y-polarization component before converting the optical signal into an electrical signal for processing according to the present disclosure.

Figure 2:
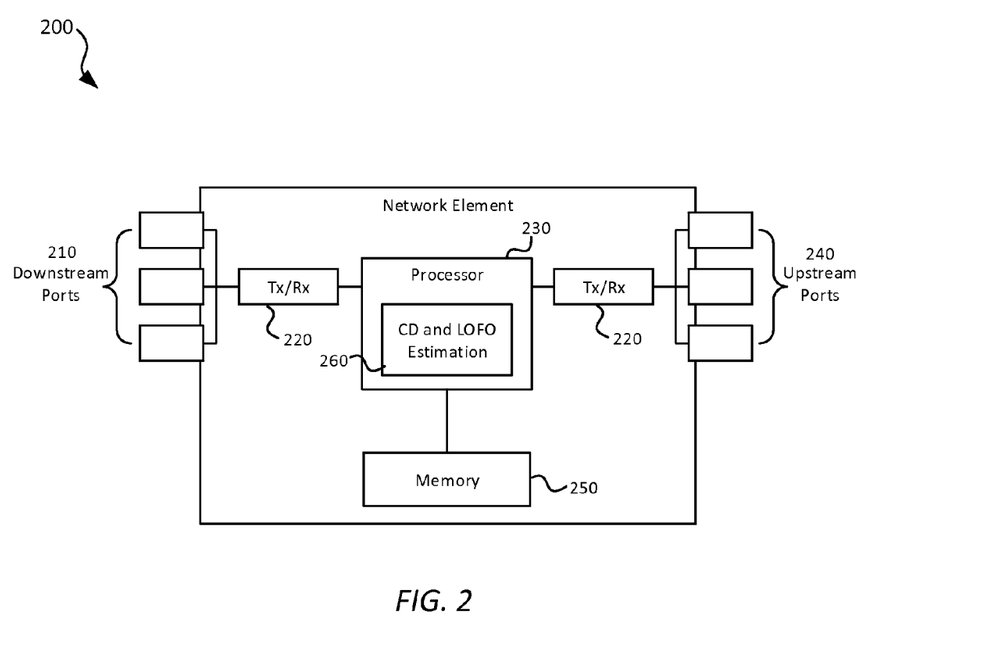
FIG. 2 is a schematic diagram of an embodiment of a network element for operating in an optical communications network.

FIG. 2 is a schematic diagram of a network device 200 for operating in an optical communications network. The network device 200 is suitable for implementing the disclosed embodiments, including the methods 600, 700, and 800 discussed below. The network device 200 comprises downstream ports 210, transceiver units (Tx/Rx) 220 for transmitting or receiving data, a processor, logic unit, or central processing unit (CPU) 230 to process the data, upstream ports 240 for transmitting or receiving the data, and a memory 250 for storing the data. The network device 200 may also comprise optical-to-electrical (OE) components and electrical-to-optical (EO) components coupled to the downstream ports 210, transceiver units 220, and upstream ports 240 for egress or ingress of optical or electrical signals. For example, the OE or EO components may comprise laser diodes or optical detectors.

The processor 230 may be implemented by hardware and software. The processor 230 may be implemented as one or more CPU chips, cores (e.g., as a multi-core processor), field-programmable gate arrays (FPGAs), application specific integrated circuits (ASICs), and digital signal processors (DSPs). The processor 230 is in communication with the downstream ports 210, transceiver units 220, upstream ports 240, and memory 250. The processor 230 comprises a CD and LOFO estimation module 260. The CD and LOFO estimation module 260 performs at least part of the methods 600, 700, and 800. The inclusion of the CD and LOFO estimation module 260 therefore provides an improvement to the functionality of the network device 200. The CD and LOFO estimation module 260 also effects a transformation of the network device 200 to a different state. Alternatively, the CD and LOFO estimation module 260 is implemented as instructions stored in the memory 250 and executed by the processor 230.

The memory 250 comprises one or more disks, tape drives, and solid-state drives and may be used as an overflow data storage device, to store programs when such programs are selected for execution, and to store instructions and data that are read during program execution. The memory 250 may be volatile or non-volatile, and may be read-only memory (ROM), random-access memory (RAM), ternary content-addressable memory (TCAM), or static random-access memory (SRAM).

Figure 3:
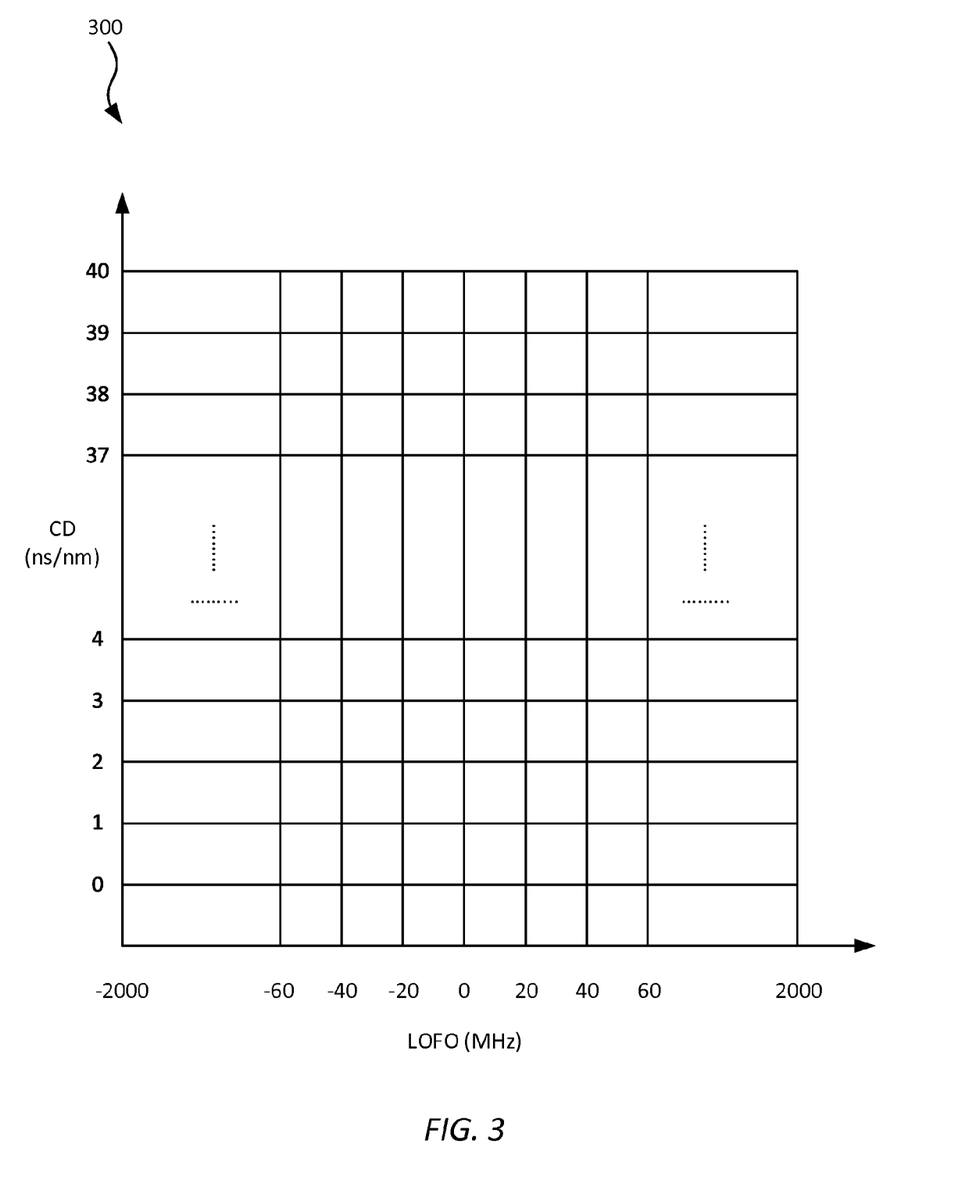
FIG. 3 is a diagram of an embodiment of a measurement grid used in an optical communications network.

FIG. 3 is a diagram of an embodiment of a measurement grid 300 used in an optical communications network. Measurement grid 300 comprises a two-dimensional grid suitable for determining CD and LOFO jointly (e.g., simultaneously or substantially simultaneously). Alternatively, measurement grid 300 may be implemented using any number of dimensions and may incorporate other measurements in addition to CD and LOFO. Measurement grid 300 may measure one, but not both, of CD and LOFO with the other being provided by any other suitable means. As an example of a two-dimensional implementation of measurement grid 300 in which CD and LOFO are determined, measurement grid 300 may place CD values measured in picoseconds (ps) per nanometer (nm) on one axis, for example on the Y-axis, and LOFO values measured in megahertz (MHz) on another axis, for example on the X-axis. The particular axis of the measurement grid on which the CD values are placed and the particular axis on which the LOFO values are placed are interchangeable and may be determined according to a particular design implementations. For the following discussion, the LOFO values will be located on the X-axis and the CD values will be located on the Y-axis. Each point in measurement grid 300 created by an intersection of Y-axis CD values and X-axis LOFO values is processed to determine a final metric according to steps of the present disclosure (e.g., according to method 600, discussed below with respect to FIG. 6). Minimum and maximum values placed along the Y-axis and the X-axis for the CD and LOFO, respectively, are determined according to a maximum amount of distortion and/or impairment expected in the optical signal, as well as a desired level of accuracy in the estimation of CD and LOFO for compensation determined according to the present disclosure. To achieve greater accuracy, the range of expected distortion and/or impairment is divided into finer intervals (e.g., a higher resolution) such that the measurement grid 300 has more intersecting grid points for processing (e.g., according to steps of method 800, discussed below with respect to FIG. 8). Accordingly, a high level of control may be exercised over a degree of accuracy of determinations made according to grid points in the measurement grid 300, thereby making measurement grid 300 configurable and/or programmable to support any range of CD and LOFO values and/or any resolution of measurement.

Figure 4:
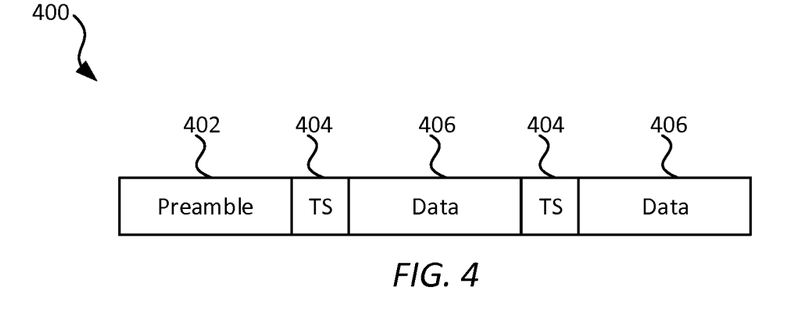
FIG. 4 is a schematic diagram of an embodiment of an optical transmission frame.

FIG. 4 is a schematic diagram of an embodiment of an optical transmission frame 400 that is about 512 symbols in length. The optical transmitter 102 may transmit the frame 400 to the optical receiver 104. To enable the optical receiver 104 to determine an estimation of CD and LOFO that provides for optimal compensation, a reference training preamble 402 is transmitted in an optical signal at the beginning of transmission of the frame 400. The reference training preamble 402 is transmitted a single time at an initiation of transmission of the optical signal from the optical transmitter 102 to the optical receiver 104. Alternatively, a plurality of reference training preambles 402 are transmitted at the beginning of each transmission between the optical transmitter 102 and the optical receiver 104 when the transmission is a burst transmission that has a length greater than 512 symbols. In addition to the training preamble 402, the frame 400 comprises a 16 symbol length training sequence (TS) 404 and a data payload 406. In one embodiment, the preamble 402 comprises a plurality of basic data sequences, for example, sequences of symbols. The basic data sequences may be any data sequences that have low cross-correlation and/or low orthogonality properties. The basic data sequences are transmitted sequentially in preamble 402 such that an optical receiver that receives the sequence is able to compare an internally stored version of the basic data sequence with the received basic data sequence to establish a timing synchronization with the optical signal before proceeding to make a determination of an estimation of CD and LOFO according to steps of method 800, discussed below with respect to FIG. 8.

Preamble 402 is configured to enable the optical receiver to use available resources (e.g., hardware resources such as memory and/or processors) for processing to determine the estimation of CD and LOFO so that no additional hardware is necessary. Accordingly, a length of preamble 402 is configured to allow the available resources in the optical receiver to process the preamble 402 to determine the estimation of CD and LOFO. For example, an optical receiver containing hardware that facilitates parallel processing may enable simultaneous processing of preamble 402, thereby resulting in reduced processing time and a shorter length of preamble 402 required by the optical receiver to successfully complete processing. As a result, for example, an optical receiver with more available resources may not require a preamble 402 with a length as long as an optical receiver with fewer available resources would require, and therefore, the length of preamble 402 may be configured according to those available resources.

Figure 5:
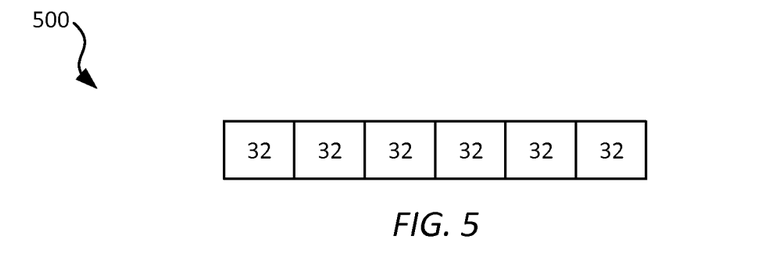
FIG. 5 is a schematic diagram of an embodiment of a reference training preamble.

FIG. 5 is a schematic diagram of an embodiment of a reference training preamble 500, which may be the preamble 402 in the frame 400. Preamble 500 comprises a plurality of 32-symbol Golay sequences in order to provide for rapid acquisition of timing synchronization and accurate CD and LOFO estimation by an optical receiver, for example optical receiver 104, in varying conditions ranging from a limited amount of impairment to a worst case impairment of long-haul communications networks and/or short-distance networks (e.g., short-distance networks utilizing a burst mode communication process). For example, in an embodiment of preamble 500 that uses a plurality of 32 symbol Golay sequences, an acquisition of timing synchronization and a determination of an initial LOFO range of +/−5 GHz estimated to within an accuracy of +/−20 megahertz (MHz) may be made in less than 1 millisecond (ms) in the presence of CD of +/−40 nanosecond (ns) per nm.

A particular number of symbol sequences in the preamble 500, as well as a particular number of symbols used per symbol sequence, may vary according to implementation and design trade-off choices. For example, the number of symbol sequences and/or the number of symbols per symbol sequence may be varied based on an amount of time available for establishing timing alignment and processing the preamble 500. For example, as discussed above, the number of symbol sequences may be varied according to processing hardware available in an optical receiver (e.g., receiver 104, shown in FIG. 1) to take advantage of parallel processing capabilities (e.g., as a result of multiple thread or multiple core processing) or to use existing hardware without necessitating additional hardware be added.

Additionally, the number of symbols per symbol sequence may be varied to tune or configure the preamble 500 to a specific performance goal. For example, in short distance networks (e.g., intra-datacenter) that expect a reduced amount of impairment in a received optical signal, a low number of symbols per symbol sequence may be used (e.g., 16 symbols per symbol sequence). In a long-haul network (e.g., a network using a trans-Atlantic cable), a higher number of symbols per symbol sequence may be used (e.g., 32 symbols per symbol sequence) to provide a performance optimized to the long-haul nature of the network, as compared to short distance networks. Generally, a lower number of symbols per symbol sequence may result in a more rapid acquisition of timing synchronization by a receiver and may or may not benefit or impair processing of the preamble 500 based on particular circumstances of the network and the connection through which the preamble 500 was received.

As discussed below with respect to method 800 in FIG. 8, when preamble 500 comprises repeating Golay sequence instances, an estimation of CD and LOFO is determined by an optical receiver by correlating preamble 500 with one local instance of the Golay sequence. Accuracy of the correlation increases (e.g., is a maximum) when a beginning of a Golay sequence instance in preamble 500 and the beginning of a locally stored instance of the Golay sequence (e.g., an instance of the Golay sequence stored in a memory of the optical receiver for use as a reference) are aligned and have established a timing synchronization. Similarly, as would be understood by one of ordinary skill in the art, alternative sequences with low cross-correlation and orthogonality properties used in preamble 500 will also have an improved accuracy when aligned with a locally stored reference instance of the alternative sequence. When preamble 500 uses repeating 32 symbol Golay sequence instances and optical receiver receives an optical signal and begins to attempt to establish timing synchronization with the optical signal via preamble 500, a timing mismatch between the optical signal and the optical receiver is at most 31 symbols away from ideal timing. Generally, in a system that implements preamble 500 comprising a plurality of symbol sequences each comprising a number of symbols X, the system will be no greater than X−1 symbols away from ideal timing at any time.

Figure 6:
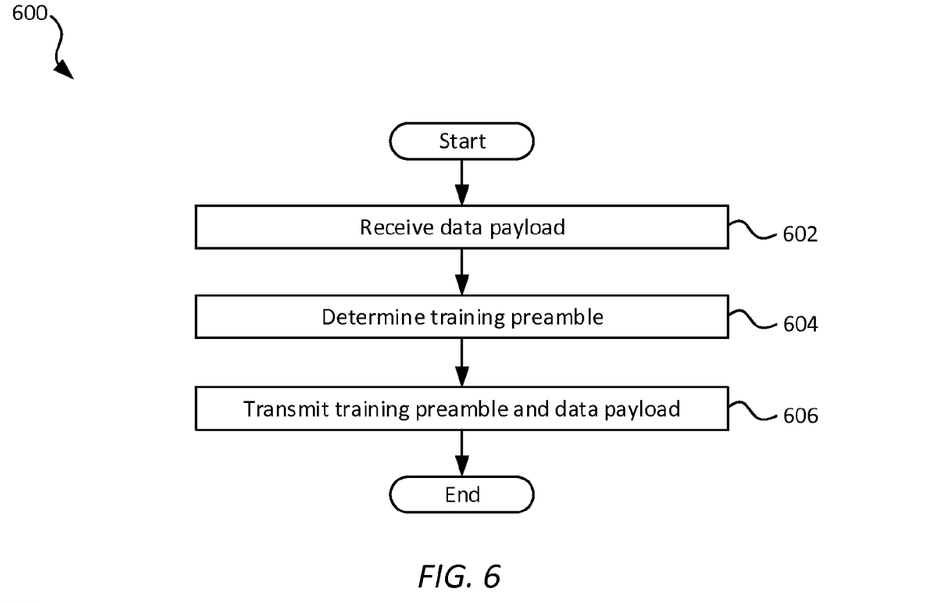
FIG. 6 is an embodiment of a method for compensating for impairments in an optical signal.

FIG. 6 is an embodiment of a method 600 for compensating for impairments in an optical signal. To compensate for impairments in an optical signal, for example CD and LOFO, an optical transmitter determines a training preamble, for example the preamble 500, to transmit to an optical receiver in an optical transmission frame, for example frame 400, to provide for estimation and compensation of the impairments. At step 602, the optical transmitter receives a data payload for transmission to the optical receiver. At step 604, the optical transmitter determines a training preamble for transmission along with the data payload. As discussed above, the training preamble may comprise a plurality of repeating symbol sequences, where the sequence has a low cross-correlation and orthogonality. The training preamble is determined according to predefined protocols established between the optical transmitter and the optical receiver to ensure that both the optical transmitter and the optical receiver have knowledge of the particular symbol sequence being used as the training preamble. At step 606, the optical transmitter appends the training preamble to the data payload and transmits the data payload to the optical receiver.

Figure 7:
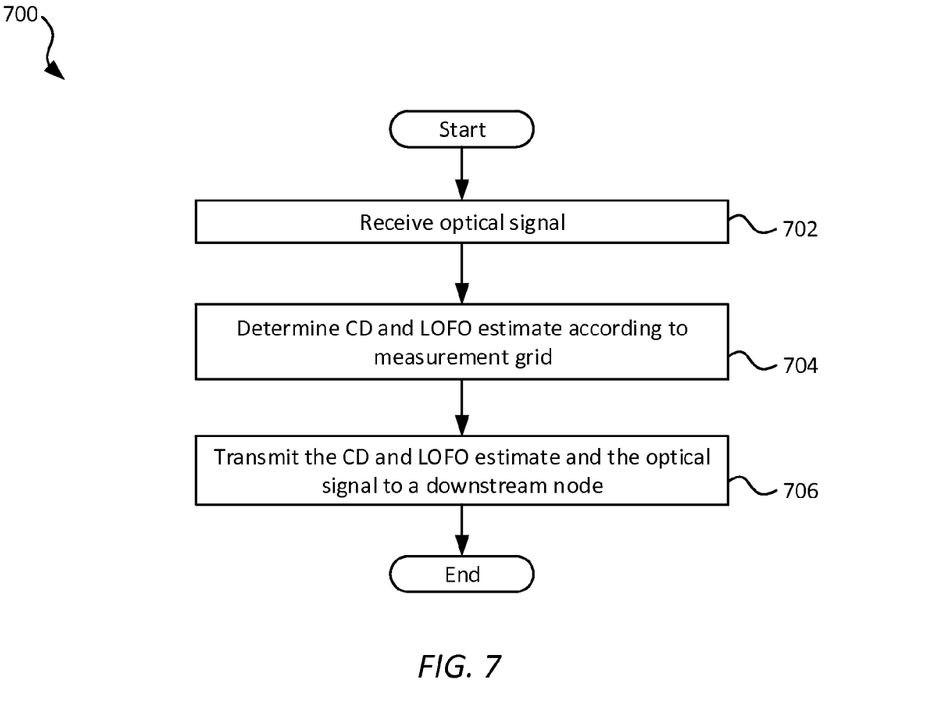
FIG. 7 is an embodiment of another method for compensating for impairments in an optical signal.

FIG. 7 is an embodiment of another method 700 for compensating for impairments in an optical signal. For a received optical signal that suffers from impairments and contains a training preamble and a data payload, an optical receiver can determine a compensation for the impairments according to the training preamble. At step 702, the optical receiver receives the optical signal from an optical transmitter. At step 704, the optical receiver determines a CD and LOFO estimate according to a measurement grid. To facilitate a rapid estimation of the CD and LOFO, the CD estimate and the LOFO estimate are determined jointly according to a multi-dimensional measurement grid. For example, the CD and LOFO estimate is determined according to method 800, discussed below. At step 706, the optical receiver transmits the CD and LOFO estimate and the optical signal to a downstream node to facilitate compensation for the impairments in the optical signal and subsequent processing of the data payload in the optical signal.

Figure 8:
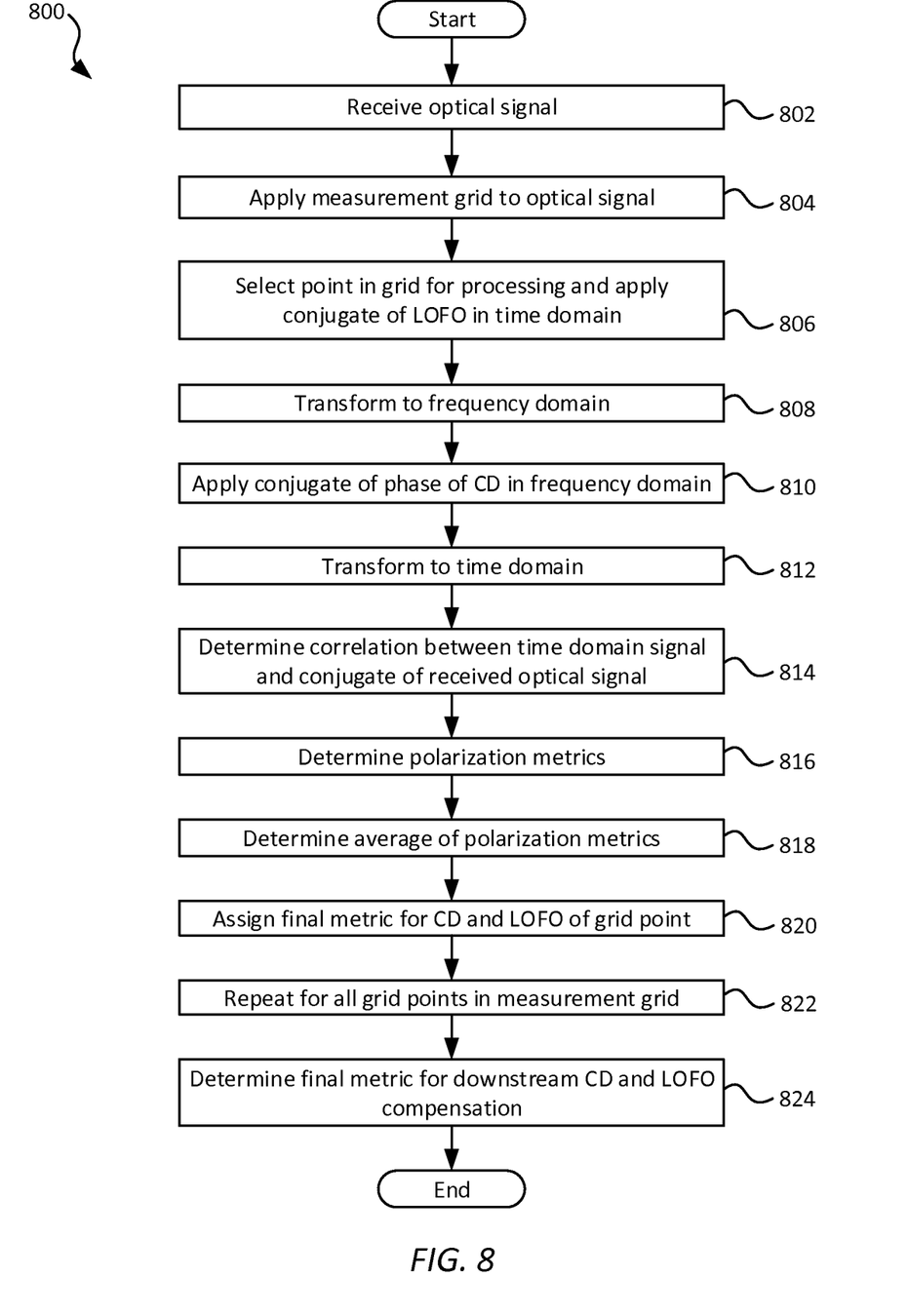
FIG. 8 is an embodiment of a method for determining CD and LOFO compensation.

FIG. 8 is an embodiment of a method 800 for determining CD and LOFO compensation that may be implemented, for example, in a receiver in an optical communications network (e.g., a coherent optical receiver in a single carrier and/or subcarrier coherent optical communications network). At step 802, an optical signal is received in a time domain by an optical receiver from an optical transmitter via a fiber optic cable, for example, received by the receiver 104 from the transmitter 102 via the connection 106 according to the network 100, shown in FIG. 1. The optical signal comprises a plurality of components, (e.g., an X-polarization component and a Y-polarization component, which themselves may each comprise an in-phase (I) and a quadrature (Q) component).

For the following discussion, both the X-polarization component and the Y-polarization component will be referred to collectively as the "optical signal" for the sake of simplicity unless, in certain circumstances, greater clarity will result from referring to both components individually. However, both the X-polarization component and a Y-polarization component are processed according to various steps of method 800 and the present disclosure. The following equations that manipulate and/or transform the X-polarization component or a signal originating as the X-polarization component are denoted with a subscript "x" (e.g., $S_x(n)$) while equations that manipulate and/or transform the Y-polarization component or a signal originating as the Y-polarization component are denoted with a subscript "y" (e.g., $S_y(n)$).

At step 804, a measurement grid, for example, measurement grid 300, shown in FIG. 3, is applied to the optical signal by mapping the CD and LOFO values of a predetermined number of symbols in the optical signal, for example in a reference training preamble of the optical signal, to a corresponding point in the measurement grid. In one embodiment, the measurement grid is two-dimensional. However, in alternative embodiments the measurement grid may be multi-dimensional, having any suitable number of dimensions that enable determination of a desired number of factors and/or impairments of the optical signal in addition to CD and LOFO. Minimum and maximum values for each axis of the measurement grid, as well as a number of increments between the minimum values and the maximum values are determined according to an expected level of impairment in the optical signal, a desired level of accuracy, and a desired level of performance. For example, large incremental divisions between the minimum and maximum values may result in fewer intersecting grid points in the measurement grid and a faster completion of method 800 at a lower rate of accuracy. Alternatively, for example, smaller incremental divisions may result in a greater number of intersecting grid points in the measurement grid and a slower completion of method 800 at a higher rate of accuracy. In some embodiments, a use of parallel processing techniques (e.g., as a result of a receiver having a large amount of available processing resources) may allow an implantation of method 800 using smaller incremental divisions to complete as fast or faster than an implementation using larger incremental divisions. Accordingly, the method 800 may be configurable or programmable to provide an estimation for CD and LOFO compensation that is tailored and/or optimized for particular circumstances or conditions of a network in which the method 800 is operating.

At step 806, a CD and LOFO combination is selected for processing by selecting an intersecting grid point of the measurement grid in a time domain such that an associated CD value from a Y-axis of the grid and an associated LOFO value from an X-axis of the grid are read for processing. The particular intersecting grid point in the measurement grid that is selected first for processing, and an order of selection of intersecting grid points for subsequent processing, is a matter of design choice and is not limited by the present disclosure. A conjugate of the LOFO value at the selected intersecting grid point in the measurement grid is applied to the optical signal in the time domain according to:

$$S_x(n) = R_x(n) * e^{-j\frac{2\pi f_o n}{f_s}}, n = 0 \ldots (N-1) \quad (1)$$

$$S_y(n) = R_y(n) * e^{-j\frac{2\pi f_o n}{f_s}}, n = 0 \ldots (N-1), \quad (2)$$

wherein S(n) is the resulting signal in the time domain, R(n) is a preamble of the optical signal (e.g., the preamble 500, shown in FIG. 5) in the time domain, $f_o$ is a value of the LOFO at the selected intersecting grid point as read from the X-axis of the measurement grid, N is a length of each symbol sequence in the preamble in samples (e.g., when the preamble comprises a plurality of 32 symbol Golay sequences that are each sampled twice, N is equal to 64), and $f_s$, is a sampling frequency at which the optical signal is sampled. The sampling frequency $f_s$ may be determined according to specific applications or implementations of method 800. For example, a lower sampling frequency may require a reduced amount of processing hardware in the receiver as compared to a higher sampling frequency that may require a larger amount of processing hardware.

At step 808, the optical signal is transformed from the time domain to a frequency domain using a fast Fourier transform (FFT) according to:

$$T_x = \text{FFT}\{S_x\} \quad (3)$$

$$T_y = \text{FFT}\{S_y\} \quad (4)$$

wherein S is the time domain signal resulting from the conjugate operation of step 806, FFT denotes the FFT operation, and T is the resulting signal in the frequency domain.

At step 810, the optical signal in the frequency domain that results from step 808 is transformed by applying a conjugate of a phase response of the CD value at the selected intersecting grid point in the measurement grid according to:

$$T_x(k) = T_x(k) * e^{-j\frac{\lambda^2 D \pi k^2 f(k)^2}{N^2 c}}, k = 0 \ldots N-1 \quad (5)$$

$$T_y(k) = T_y(k) * e^{-j\frac{\lambda^2 D \pi k^2 f(k)^2}{N^2 c}}, k = 0 \ldots N-1, \quad (6)$$

wherein T(k) is the resulting signal in the frequency domain, D is a value of the CD at the selected intersecting grid point as read from the Y-axis of the measurement grid, c is a speed of light constant, $\lambda$ is a wavelength of the operation of step 810, and f(k) is sampled frequency point of the optical signal in the frequency domain. Alternatively, f(k) represents discrete points on the frequency axis of the signal FFT.

At step 812, the optical signal is transformed from the frequency domain to the time domain using an inverse fast Fourier transform (IFFT) according to:

$$U_x = \text{IFFT}\{T_x\} \quad (7)$$

$$U_y = \text{IFFT}\{T_y\}, \quad (8)$$

wherein T is the frequency domain signal resulting from the conjugate operation of step 810, IFFT denotes the IFFT operation, and U is the resulting signal in the time domain.

At step 814, a correlation is determined between the optical signal in the time domain and a conjugate of both the X-polarization component of the preamble and the Y-polarization component according to:

$$U_{xx}(n) = \sum_{k=0}^{n} U_x(k) * \text{conj}(P_x(N-n+k)), n = 0 \ldots (2N-2) \quad (9)$$

$$U_{xy}(n) = \sum_{k=0}^{n} U_x(k) * \text{conj}(P_y(N-n+k)), n = 0 \ldots (2N-2) \quad (10)$$

$$U_{yx}(n) = \sum_{k=0}^{n} U_y(k) * \text{conj}(P_x(N-n+k)), n = 0 \ldots (2N-2) \quad (11)$$

$$U_{yy}(n) = \sum_{k=0}^{n} U_y(k) * \text{conj}(P_y(N-n+k)), n = 0 \ldots (2N-2), \quad (12)$$

wherein $U_{xx}(n)$ is the resulting correlation between the optical signal, for example, an X-polarization of the optical signal, in the time domain resulting from step 812 and the X-polarization component of a locally generated preamble ($P_x$), $U_{xy}(n)$ is the resulting correlation between the optical signal, for example the X-polarization component of the optical signal, in the time domain from step 812 and the Y-polarization component of a locally generated preamble ($P_y$), $U_{yx}(n)$ is the resulting correlation between the optical signal, for example, a Y-polarization of the optical signal, in the time domain from step 812 and $P_x$, $U_{yy}(n)$ is the resulting correlation between the optical signal, for example, the Y-polarization of the optical signal in the time domain from step 812 and $P_y$. U(k) is the optical signal in the time domain from step 812, and conj denotes a conjugate operation. In one embodiment, the correlation may be determined according to a sliding window correlation scheme that may facilitate parallel processing by the receiver. Other correlation schemes may be implemented to come to the same final result with certain design trade-offs. As one example, a serial-multiply-accumulate correlation scheme may be implemented when rapid determination of the correlation is not necessary.

At step 816, the correlation results of step 814 are used to determine a polarization metric for the optical signal according to:

$$M_x(n) = \text{abs}(U_{xx}(n))^2 + \text{abs}(U_{xy}(n))^2, n=0 \ldots (2N-2) \quad (13)$$

$$M_y(n) = \text{abs}(U_{yx}(n))^2 + \text{abs}(U_{yy}(n))^2, n=0 \ldots (2N-2) \quad (14)$$

wherein M(n) is the resulting optical signal metric, and abs denotes an absolute value operation.

At step 818, the polarization metrics determined at step 816 are averaged over a given number of successive instances of the preamble sequence according to:

$$\hat{M}_x(n) = \sum_{j=1}^{J} M_x(j, n), n = 0 \ldots (2N-2) \qquad (15)$$

$$\hat{M}_y(n) = \sum_{j=1}^{J} M_y(j, n), n = 0 \ldots (2N-2), \qquad (16)$$

wherein M(n) is the resulting averaged optical signal metric, and J is the number of successive instances of the symbol sequence of the preamble over which the optical signal metric is averaged.

At step 820, a maximum of the averaged optical signal metrics for the selected intersecting grid in the measurement grid point being processed as determined according to step 818 is determined as the final metric for the selected intersecting grid point in the measurement grid regardless of whether the maximum value comes from the X-polarization component of the optical signal metric or the Y-polarization component of the optical signal.

At step 822, the preceding steps 804 through 820 are repeated for each intersecting grid point in the measurement grid until a final metric has been determined for every intersecting grid point in the measurement grid.

At step 824, a maximum of all final metrics determined in step 820 for every intersecting grid point in the measurement grid is determined. The CD value as read from the Y-axis at the intersecting grid point having the maximum final metric is set as the estimated CD value for compensation during downstream data processing of the optical signal. The LOFO value as read from the X-axis at the intersecting grid point having the maximum final metric is set as the estimated LOFO value for compensation during downstream data processing of the optical signal.

Method 800 may further comprise the receiver applying the determined compensation values to the optical signal before the optical signal is transmitted for downstream data processing. Method 800 may further comprise transmitting the uncompensated optical signal and the determined estimates for CD and LOFO compensation, as determined in step 824, for downstream data processing.

Figure 9:
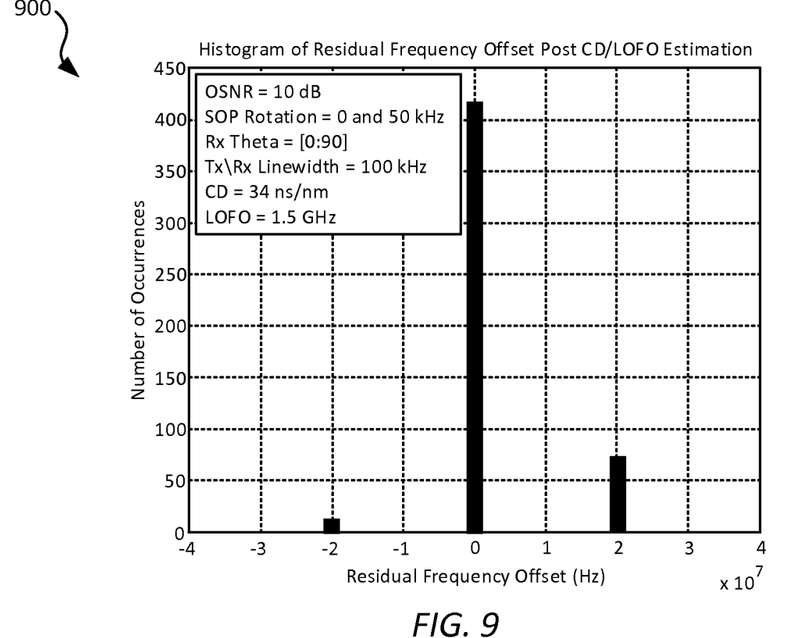
FIG. 9 is a histogram of experimental performance of an embodiment of a two-dimensional measurement grid used in a coherent optical communications system.

FIG. 9 is a histogram 900 of experimental performance of an embodiment of a two-dimensional measurement grid used in a coherent optical communications system. In histogram 900, the X-axis represents an amount of frequency offset that exists after performing estimation and compensation according to the present disclosure and the Y-axis represents a number of occurrences of symbols in an optical signal that have a given frequency value. For example, an occurrence of a symbol at 0 residual frequency offset indicates that after estimation and compensation according to the present disclosure, no frequency offset exists for that symbol. Histogram 900 demonstrates performance of LOFO estimation determined by the measurement grid based joint CD and LOFO estimation process according to various embodiments of the present disclosure operating in a worst-case scenario (e.g., a CD of 34 ns/nm and a LOFO of 1.5 GHz). As shown in histogram 900, for a received optical signal having a LOFO of 1.5 GHz, an accurate estimation (shown as having zero residual frequency offset) of the LOFO was made for a majority of the joint CD and LOFO estimation processes. As is further shown, the joint CD and LOFO estimation process was performed with a LOFO resolution of 20 MHz, thereby limiting LOFO estimation errors resulting from the joint CD and LOFO estimation process to +/−20 MHz.

Figure 10:
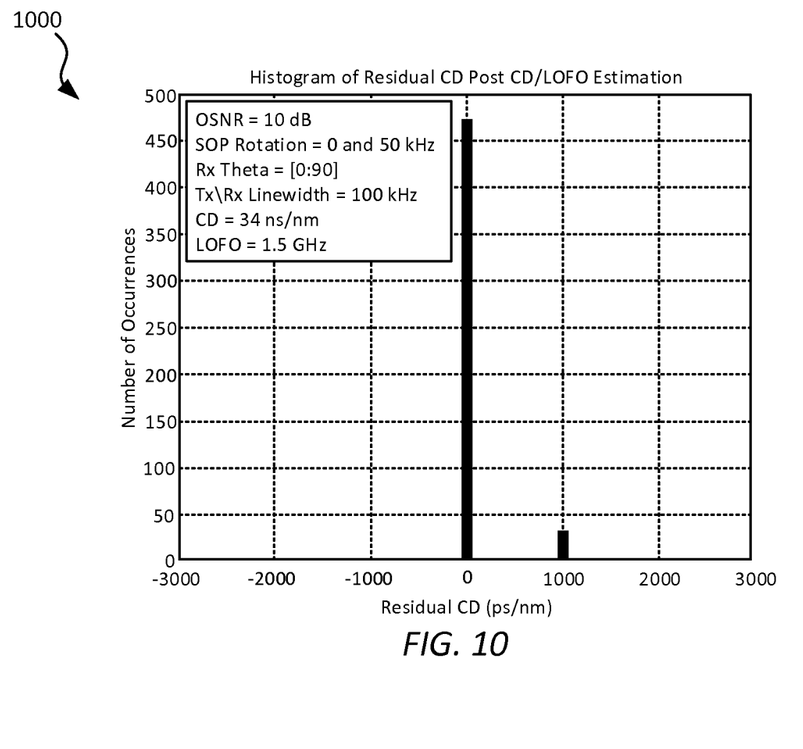
FIG. 10 is another histogram of experimental performance of an embodiment of a two-dimensional measurement grid used in a coherent optical communications system.

FIG. 10 is a histogram 1000 of experimental performance of an embodiment of a two-dimensional measurement grid used in a coherent optical communications system. In histogram 1000, the X-axis represents an amount of CD that exists after performing estimation and compensation according to the present disclosure and the Y-axis represents a number of occurrences of symbols in an optical signal that have a given frequency value. For example, an occurrence of a symbol at 0 residual CD indicates that after estimation and compensation according to the present disclosure, no CD exists for that symbol. Histogram 1000 demonstrates performance of a measurement grid based joint CD and LOFO estimation process according to various embodiments of the present disclosure operating in a worst case scenario (e.g., a CD of 34 ns/nm and a LOFO of 1.5 GHz). As with histogram 900, histogram 1000 demonstrates performance of CD estimation determined by the measurement grid based joint CD and LOFO estimation process according to various embodiments of the present disclosure operating in the worst case scenario (e.g., a CD of 34 ns/nm and a LOFO of 1.5 GHz). Histogram 1000 demonstrates performance of CD estimation based on the joint CD and LOFO estimation process of the present disclosure. As shown in histogram 1000, for a received optical signal having a CD of 34 nm/nm, an accurate estimation (shown as having zero residual CD) of the CD was made for a majority of the joint CD and LOFO estimation processes. As is further shown, the joint CD and LOFO estimation process was performed with a CD resolution of 1000 ps/nm, resulting in any errors in the joint CD and LOFO estimation process having CD estimation errors that are no more than +/−1 ns/nm.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical transceiver in an optical communications network, the optical transceiver comprising:
 a receiver configured to receive an optical signal comprising an X-polarization component and a Y-polarization component;
 a processor coupled to the receiver and configured to:
   determine a chromatic dispersion (CD) estimate and a local oscillator frequency offset (LOFO) estimate based on a relationship between a plurality of CD values and a plurality of LOFO values, wherein the relationship is a two-dimensional measurement grid associated with the optical signal, wherein the two-dimensional measurement grid comprises a plurality of intersecting grid points, and wherein a first axis of the two-dimensional measurement grid comprises the CD values and a second axis of the two-dimensional measurement grid comprises the LOFO values;

select an intersecting grid point in the two-dimensional measurement grid, wherein the intersecting grid point is associated with a first CD value and a first LOFO value;

process the optical signal at the intersecting grid point in a time domain;

process the optical signal at the intersecting grid point in a frequency domain; and determine a first metric for the optical signal at the intersecting grid point according to the optical signal after the processing in the time domain and the frequency domain; and a transmitter coupled to the processor and configured to transmit the CD estimate, the LOFO estimate, and the optical signal to a downstream component in the optical communications network.

2. The transceiver of claim 1, wherein the optical signal comprises a reference training preamble that comprises a plurality of sequentially transmitted repeating symbol sequences.

3. The transceiver of claim 2, wherein the processor is further configured to:

apply a conjugate of the first LOFO value to the X-polarization component and the Y-polarization component to form a processed optical signal comprising a processed X-polarization component and a processed Y-polarization component; and determine a frequency domain representation for the processed optical signal in the time domain.

4. The transceiver of claim 3, wherein the processor is further configured to:

apply a conjugate of a phase value of the first CI) value to the processed X-polarization component and the processed Y-polarization component; and determine a time domain representation for the processed optical signal in the frequency domain.

5. The transceiver of claim 4, wherein the processor is further configured to:

correlate the processed X-polarization component to a first conjugate of the X-polarization component of a locally generated preamble;

correlate the processed X-polarization component to a second conjugate of the Y-polarization component of the locally generated preamble;

correlate the processed Y-polarization component to the first conjugate of the X-polarization component of the locally generated preamble; and correlate the processed Y-polarization component to the second conjugate of the Y-polarization component of the locally generated preamble.

6. The transceiver of claim 4, wherein the processor is further configured to:

determine a first average of metrics of the processed X-polarization component over a time period;

determine a second average of metrics of the processed Y-polarization component over the time period;

determine a first maximum of the first average;

determine a second maximum of the second average; and determine a final metric, wherein the final metric comprises a greater value of the first maximum and the second maximum.

7. The transceiver of claim 6, wherein the processor is further configured to determine additional final metrics for each of a plurality of additional intersecting grid points in the two-dimensional measurement grid.

8. The transceiver of claim 7, wherein the processor is further configured to determine the CD estimate and the LOFO estimate according to a third maximum value of the final metrics.

9. The transceiver of claim 1, wherein the processor is further configured to apply the CD estimate and the LOFO estimate to the optical signal prior to transmitting the optical signal to the downstream component.

10. A method implemented in an optical transceiver, the method comprising:

receiving, by a receiver module, a data payload;

determining, by a processor, a training preamble based on an amount of time available for an optical receiver associated with the optical transceiver to establish timing alignment and to process the training preamble, wherein the training preamble comprises only a plurality of a same data sequence, and wherein the data sequence comprises a basic data sequence to reduce cross-correlation and maintain orthogonality between X-polarization components and Y-polarization components; and transmitting, by a transmitter module, the training preamble and the data payload to an optical receiver to provide for acquisition of a timing synchronization between the optical receiver and the training preamble.

11. The method of claim 10, wherein the data sequence is a 32 symbol Golay sequence.

12. The method of claim 10, further comprising determining the training preamble further based on whether an optical receiver associated with the optical transceiver comprises parallel processing hardware.

13. The method of claim 10, further comprising determining the training preamble further based on a distance of a network that the optical transceiver is in.

14. A method for compensating for impairments in an optical signal and implemented in an optical transceiver in a communications network, the method comprising:

receiving, from an optical transmitter, an optical signal;

determining, according to the optical signal, a chromatic dispersion (CD) estimate and a local oscillator frequency offset (LOFO) estimate for joint compensation jointly according to a relationship between a plurality of CD values and a plurality of LOFO values, wherein the relationship is a measurement grid, wherein the measurement grid comprises a plurality of intersecting grid points, wherein a first axis of the measurement grid comprises a first CD value and a second axis of the measurement grid comprises a first LOFO value, and wherein the determining comprises calculating the first CD value dynamically according to a minimum expected CD and a maximum expected CD and calculating the first LOFO value dynamically according to a minimum expected LOFO and a maximum expected LOFO;

selecting a first intersecting grid point in the measurement grid, wherein the first intersecting grid point comprises the first CD value and the first LOFO value;

processing the optical signal a first time in a time domain according to a conjugate of the first LOFO value;

processing the optical signal in a frequency domain according to a conjugate of a phase response due to the first CD value;

processing the optical signal a second time in the time domain to determine a correlation of the optical signal with a conjugate of a preamble of the optical signal;

calculating a polarization metric for the optical signal;

calculating an average of the optical signal in the time domain according to the correlation of the optical signal with the conjugate of the preamble of the optical signal;

calculating a first final metric for the first intersecting grid point; and transmitting the CD estimate, the LOFO estimate, and the optical signal to a downstream node in the communications network for processing by the downstream node, wherein the CD estimate and LOFO estimate facilitate processing of the optical signal by the downstream node.

15. The method of claim 14, wherein the determining further comprises calculating a second final metric for a second intersecting grid point in the measurement grid.

16. The method of claim 15, wherein the determining further comprises calculating the CI) estimate and the LOFO estimate according to a maximum of the first final metric and the second final metric.

17. The method of claim 14, wherein the optical signal comprises a reference training preamble that comprises a plurality of sequentially transmitted repeating data sequences.

18. The method of claim 17, wherein the preamble comprises a plurality of Golay sequences.

* * * * *

UNITED STATES PATENT AND TRADEMARK OFFICE
CERTIFICATE OF CORRECTION

PATENT NO. : 9,806,814 B2
APPLICATION NO. : 14/951195
DATED : October 31, 2017
INVENTOR(S) : Murali Krishnan et al.

It is certified that error appears in the above-identified patent and that said Letters Patent is hereby corrected as shown below:

On the Title Page

Column 1, (73) Assignee: should read:
Futurewei Technologies, Inc., Plano, TX (US)

In the Claims

Column 14, Lines 55-67, through Column 15, Lines 1-22, Claim 1 should read:
1. An optical transceiver in an optical communications network, the optical transceiver comprising:
    a receiver configured to receive an optical signal comprising an X-polarization component and a Y-polarization component;
    a processor coupled to the receiver and configured to:
        determine a chromatic dispersion (CD) estimate and a local oscillator frequency offset (LOFO) estimate based on a relationship between a plurality of CD values and a plurality of LOFO values, wherein the relationship is a two-dimensional measurement grid associated with the optical signal, wherein the two-dimensional measurement grid comprises a plurality of intersecting grid points, and wherein a first axis of the two-dimensional measurement grid comprises the CD values and a second axis of the two-dimensional measurement grid comprises the LOFO values;
        select an intersecting grid point in the two-dimensional measurement grid, wherein the intersecting grid point is associated with a first CD value and a first LOFO value;
        process the optical signal at the intersecting grid point in a time domain;
        process the optical signal at the intersecting grid point in a frequency domain; and
        determine a first metric for the optical signal at the intersecting grid point according to the optical signal after the processing in the time domain and the frequency domain; and
    a transmitter coupled to the processor and configured to transmit the CD estimate, the LOFO estimate, and the optical signal to a downstream component in the optical communications network.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,806,814 B2

Column 15, Lines 36-42, Claim 4 should read:
4. The transceiver of claim 3, wherein the processor is further configured to:
    apply a conjugate of a phase value of the first CD value to the processed X-polarization component and the processed Y-polarization component; and
    determine a time domain representation for the processed optical signal in the frequency domain.

Column 17, Lines 20-23, Claim 16 should read:
16. The method of claim 15, wherein the determining further comprises calculating the CD estimate and the LOFO estimate according to a maximum of the first final metric and the second final metric.